R. C. Grover,
Edge Tool,
N° 82,711.    Patented Oct. 6, 1868.
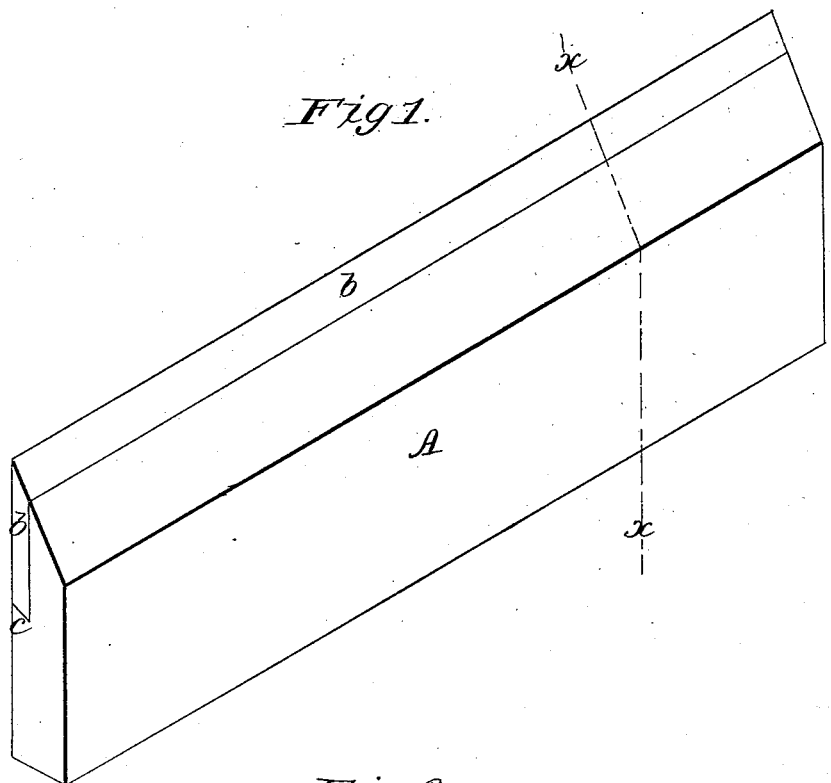
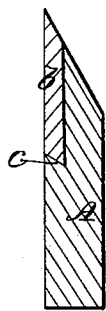
Witnesses:
Inventor:

United States Patent Office.

REUBEN C. GROVER, OF NEWTON, MASSACHUSETTS.

Letters Patent No. 82,711, dated October 6, 1868.

---

IMPROVEMENT IN MANUFACTURE OF EDGE-TOOLS.

---

*The Schedule referred to in these Letters Patent and making part of the same.*

---

TO ALL WHOM IT MAY CONCERN:

Be it known that I, REUBEN C. GROVER, of Newton, in the county of Middlesex, and State of Massachusetts, have invented an Improvement in the Manufacture of Edge-Tools, of which the following is a full, clear, and exact description, reference being had to the accompanying drawings, making part of this specification, in which—

Figure 1 is a perspective view of the knife of a leather-splitting machine, illustrating my improvement.

Figure 2 is a section on the line $x\, x$ of fig. 1.

In the manufacture of large knives, such as those used for machines for splitting leather, cutting veneers, &c., it is customary to weld the steel to the stock or main portion of the knife, after which it is finished, and finally hardened so as to give the required temper to the steel. In the process of tempering, however, the steel is frequently cracked or broken, rendering the entire knife worthless, and thus involving the loss of much labor and stock.

Another objection is that the tempering process renders the steel extremely hard near the cutting-edge, where it is thin, but above this point, where the knife is of considerable thickness, it cannot be chilled with sufficient rapidity, and the steel is consequently left in a comparatively soft state, so that when the knife, after use, is ground down to this point, it becomes useless, and has to be replaced by a new one, which, when of large size, is very expensive.

My invention has for its object to overcome these difficulties, and consists in tempering the steel portion of the tool before uniting it with the stock or main portion, to which it is afterward secured, by means of soft solder or other material, the employment of which does not require a degree of heat sufficient to injure the temper of the steel, by which process I am enabled to give an even temper to the steel, so that it will last for a much longer time, and avoid the losses incident to the method heretofore employed.

To enable others skilled in the art to understand and use my invention, I will proceed to describe the manner in which I have carried it out.

In the said drawings, A represents the stock or main portion of the knife of a machine for splitting leather, the face of which is cut away so as to leave a longitudinal groove or seat for the reception of a steel plate, $b$, on which is formed the cutting-edge, the opposite edge being bevelled so as to fit under a correspondingly bevelled shoulder, $c$, on the portion A.

The steel plate $b$ is tempered before being applied to the portion A, and, being comparatively thin, can be evenly tempered throughout, which cannot be done when the welding process is employed, owing to the varying thickness of the knife, so that after the steel plate is united to the stock A, it can be almost entirely used up before a new knife is required, thus effecting a great saving. The steel plate $b$ is united to the main portion, A, of the knife, by means of solder or other suitable material, the melting of which does not require a temperature sufficiently high to injure the temper of the steel, and when this plate $b$ is in place, the bevelled shoulder $c$ assists in holding it firmly in place and preventing its rear end from being thrown up from the stock by any sudden strain.

By thus tempering the steel portion $b$ previous to uniting it with the stock, in the event of its cracking or breaking during the process, the only loss involved is that of the steel plate itself, and this would not be entirely lost, as the whole portions might be used for smaller knives, whereas when the steel and iron are welded together, the entire knife is rendered worthless, involving a great loss, especially when the knife is of large size.

In the event of the steel portion $b$ of my improved knife becoming gapped or broken while being used, it may be easily removed from the portion A by the employment of sufficient heat to melt the solder, and readily replaced by a new plate at a small cost, compared to that of an entire new knife, which would be required if the steel and iron were welded together.

I have spoken of my improvement as particularly applicable to the manufacture of large knives, such as those used for machines for splitting leather, &c., but it is evident that my invention may be applied to edge-tools of various descriptions without departing from the spirit of my invention.

Claim.

What I claim as my invention, and desire to secure by Letters Patent, is—

The knife A $b$, constructed as described, and as a new article of manufacture.

R. C. GROVER.

Witnesses:
P. E. TESCHEMACHER,
W. J. CAMBRIDGE.